United States Patent [19]
Savoca

[11] Patent Number: 5,311,022
[45] Date of Patent: May 10, 1994

[54] TRI-SCAN HORIZON SENSOR
[75] Inventor: Robert C. Savoca, Ridgefield, Conn.
[73] Assignee: EDO Corporation, Barnes Engineering Division, Shelton, Conn.
[21] Appl. No.: 3,154
[22] Filed: Jan. 12, 1993
[51] Int. Cl.⁵ .................................................. B64G 1/36
[52] U.S. Cl. ...................................... 250/347; 250/342; 250/353; 244/171
[58] Field of Search ............ 250/342, 347, 353, 206.1; 364/434, 459; 244/171

[56] References Cited
U.S. PATENT DOCUMENTS

| | | | |
|---|---|---|---|
| 3,576,999 | 5/1971 | Blythe | 244/171 X |
| 4,792,684 | 12/1988 | Savoca | 250/347 |
| 5,048,774 | 9/1991 | Savoca | 244/171 |

Primary Examiner—Constantine Hannaher
Assistant Examiner—Edward J. Glick
Attorney, Agent, or Firm—Parmelee, Bollinger & Bramblett

[57] ABSTRACT

At geosynchronous and other high altitudes a dual cone scanner has been a convenient way of determining both pitch and roll utilizing a single horizon sensor positioned on an orbiting spacecraft whose attitude is to be determined. However, for large roll angles, one of the scans may leave the earth or reference body defeating the purpose of the sensor. In accordance with the present invention, a third cone angle is scanned between the original two, thereby providing two good scans preserving the pitch and roll attitude information, even if one of the scans has rolled off of the reference body.

2 Claims, 3 Drawing Sheets

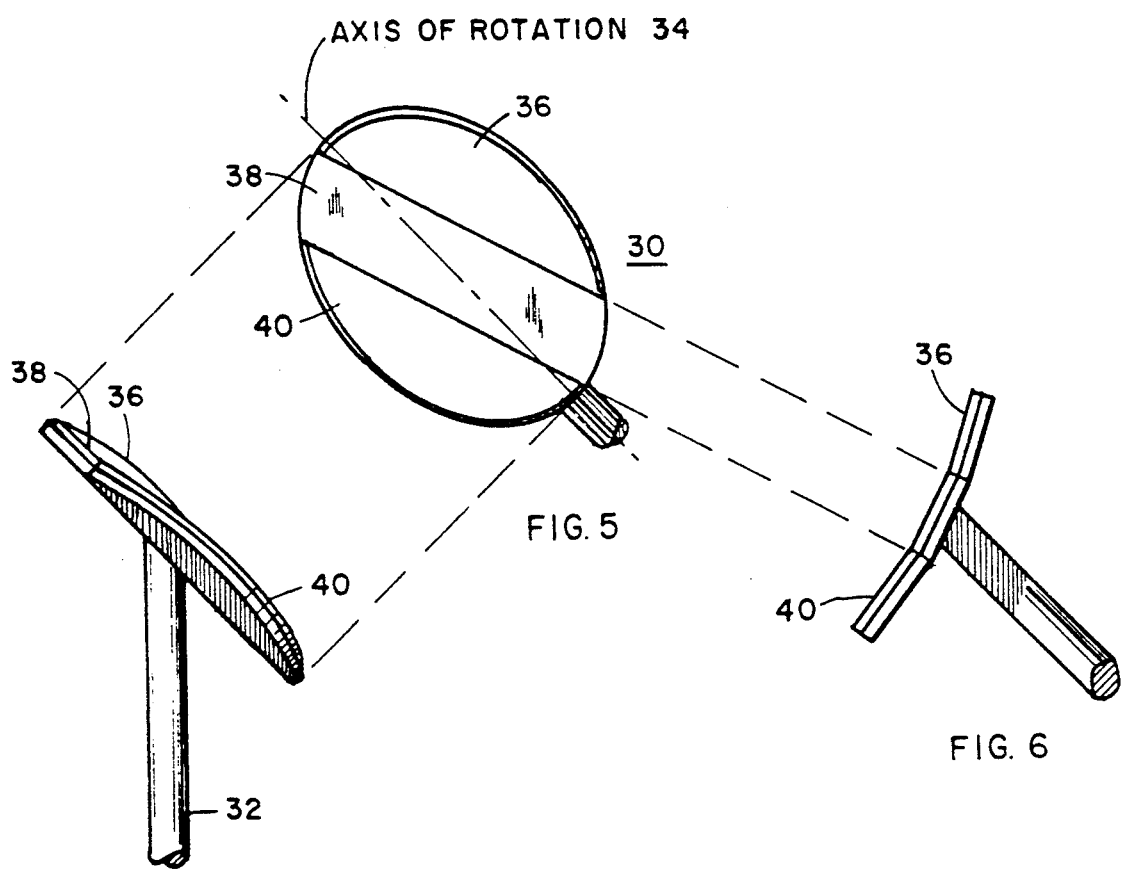

TRI-SCAN HORIZON SENSOR

Background of the Invention

This invention relates to a horizon sensor for providing pitch and roll attitude as well as altitude information of an orbiting body by scanning a line of discontinuity of optical radiation in a scan field of view and more particularly, to such a sensor having a scanner which scans at least three conical scan paths through the field of view about the same axis of rotation using an optical means and a common detector to provide two axis attitude information as well as altitude information.

In the applicant's prior U.S. Pat. No. 4,792,684, pitch and roll attitude information of an orbiting body is provided by sensing the discontinuity of optical radiation in a scanned field of view between a reference body and outer space using a scanner for providing two concentric conical scan paths through the field of view about the same axis of rotation as the orbiting body. Optical radiation from the two fields of view are applied to a detector which generates signals used to determine pitch and roll as well as altitude by using the four points of crossing between outer space and the reference body at which points the optical radiation discontinuity occurs. This dual cone scanner provides a very convenient means of determining both pitch and roll attitude information. However, at geosynchronous altitudes and other altitudes in which the spacecraft or orbiting body encounters large roll angles, one of the scans may leave the reference body, thereby defeating the measurements.

SUMMARY OF THE INVENTION

Accordingly, it is an object of the present invention to provide a new and improved horizon sensor using optical and detector means for providing at least three conical scans of the reference body, thereby providing two good scans even if one of the scans rolls off the reference body during orbit.

A further object of this invention is to provide a new and improved horizon sensor which is an improvement over U.S. Pat. No. 4,792,684 by providing at least one additional scan between the two original scans of the aforesaid patent to provide useful attitude information even if one of the scans has rolled off of the earth or reference body.

In carrying out this invention in one illustrative embodiment thereof, a horizon sensor for providing pitch and roll attitude information of an orbiting body by sensing the discontinuity of optical radiation in a scanned field of view between a reference body and outer space from a conical scanner is provided comprising a scanning means for scanning at least three spaced conical scan paths through said field of view about the same axis of rotation of an orbiting body, and a common detector means having optical radiation applied thereto from the common scanning means for generating signals used to determine pitch and roll information.

BRIEF DESCRIPTION OF THE DRAWINGS

The invention together with further objects, aspects, features and advantages thereof will be more clearly understood from the following description taken in connection with the accompanying drawings.

FIG. 4 illustrates a side elevation view of a segmented scanning mirror having three facets for providing three concentric conical scan patterns as shown in FIG. 3 in accordance with the present invention.

FIG. 5 is a top view of the scanning mirror of FIG. 4.

FIG. 6 is an auxiliary view of the scanning mirror of FIG. 4.

DESCRIPTION OF THE PREFERRED EMBODIMENTS

Figure 1:
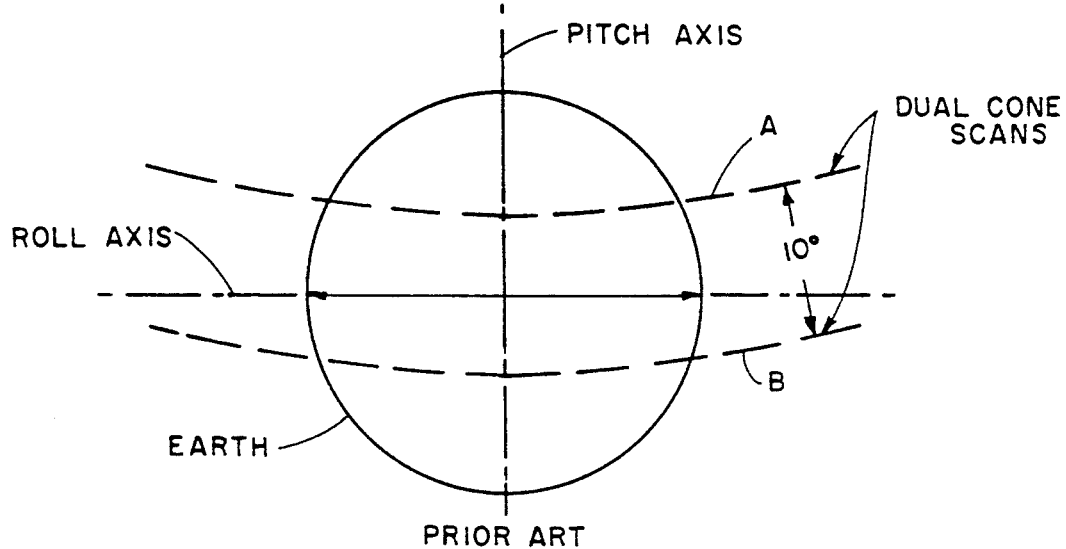
FIG. 1 is a diagrammatic illustration of a dual cone scan path of a spacecraft orbiting the earth in accordance with the prior art.

Referring first to FIG. 1, there is diagrammatically shown dual cone scan paths A and B over the earth illustrated from a geosynchronous altitude. At that scanning altitude, a $17\frac{1}{2}°$ angular diameter earth is provided and the scan paths A and B are separated by 10 degrees. Accordingly, if the orbiting satellite encounters a large roll angle, scan B as shown in FIG. 2 may leave the earth.

Figure 2:
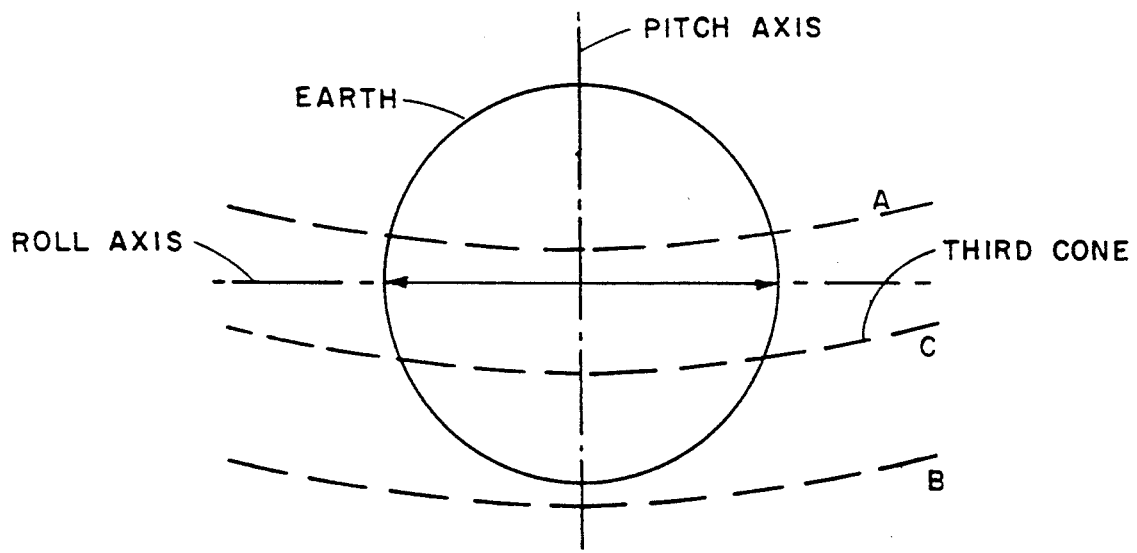
FIG. 2 is a diagrammatic illustration of an addition of a third scan path in accordance with the present invention which is situated between the dual scan paths illustrated in FIG. 1, thereby providing two scan paths which cross the reference body even if one scan path has rolled off the earth.

In accordance with the present invention as shown in FIG. 2, a solution is provided by using a third conical scan C intermediate the original scans A and B. Accordingly, even after scan B has rolled off the earth as shown in FIG. 2, two good scans are provided which can be utilized for providing pitch, roll and altitude information as described in the aforesaid patent.

Figure 3:
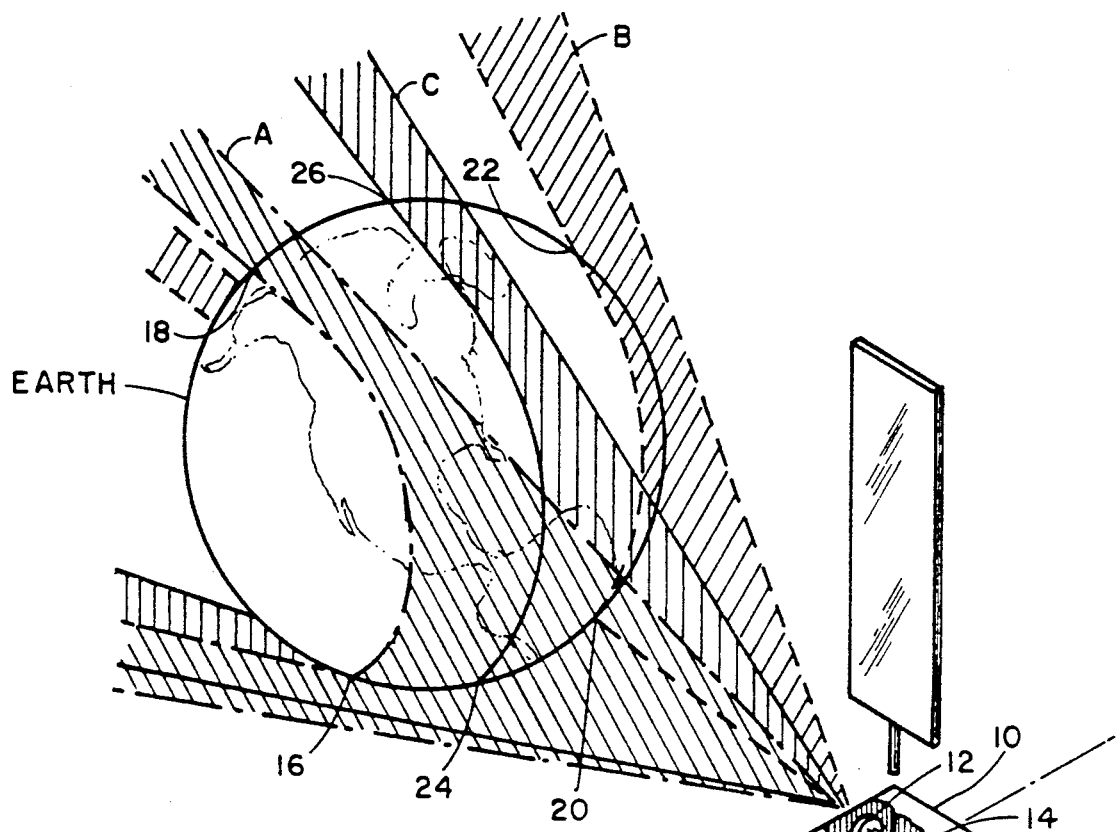
FIG. 3 diagrammatically shows three conical scans of the earth from an orbiting satellite in accordance with the present invention.

FIG. 3 illustrates an orbiting spacecraft or satellite 10 orbiting the earth, having a conical scanner 12 and an optical radiation detector 14. The scanner 12 has an optical means for scanning paths A, C and B as illustrated and applying the optical radiation received to the detector 14 for determining the attitude of the spacecraft 10. Scan A provides horizon crossings 16 and 18; scan B provides horizon crossings 20 and 22; and scan C provides horizon crossings 24 and 26, respectively. Optical radiation from these horizon crossings representing points of optical discontinuity between the reference body earth and outer space is applied to the detector 14 via the scanning optics 12 to produce rectangular signals which are utilized along with reference signals generated in the spacecraft 10 representing the position of the conical scan mechanism 12 to determine the attitude of the orbiting body 10. Each scan of the earth will thus identify at least four points among crossings 16, 18, 20, 22, 24 or 26 around the horizon, even if one of the scans is off of the reference body. Since three points fully determine a circle, the earth's angular diameter and thus altitude can be obtained from the sensor data in addition to the pitch and roll information provided by the crossings. FIG. 4 illustrates a triple faceted scanning mirror 30 mounted on a rotating shaft 32 having an axis of rotation 34 which corresponds to the axis of rotation of the spacecraft 10. The scanning mirror 30 has facets 36, 38 and 40 which form an angle with the axis of rotation 34 and an angle with each other for providing phase and elevation separation between the three conical scans illustrated in FIG. 3. At geosynchronous altitude, for example, the facet 38 forming a 45° angle with the axis of rotation 34 will be flanked by facets 36 and 40 at ±2.5 degrees. Other angles could be employed for different orbits.

The common scanning optical means 12 may be obtained as illustrated in FIG. 4 by grinding a third facet on a scanning mirror 30 or on a prism, or may use a plurality of reflecting mirrors separated in phase and elevation to provide a common scanning means. The invention would not be too useful at low altitudes as the dual field is not likely to roll off of the reference body. However, at high altitude, although there is some loss of aperture with the described embodiment in FIGS. 4, 5, 6, the additional scan provides additional accuracy and alleviates the possibility of a sun-in-field effect because two scans would still be available. Three scans might also possibly reduce radiance error by having two additional points of horizon crossings when all of the scans remain on the reference body. More than three scans may be provided by including additional facets on the scanning optics 12 provided sufficient signal is available from the scanned reference body.

The system may utilize either reflective optics or refractive optics for wide ranges of altitudes. Also, since some spacecraft are spin stabilized, the spinning action produced by the rotating mirror or prism can be accomplished by the spin motion of the entire satellite.

Since other changes and modifications vary to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What I claim is:

1. A horizon sensor for providing pitch and roll attitude information of an orbiting body by sensing the discontinuity of optical radiation in a scanned field of view between a reference body and outer space from a conical scanner comprising:
   scanning means for simultaneously scanning at least three spaced conical scan paths through said field of view about the axis of rotation of said orbiting body,
   a common detector means having optical radiation applied thereto from said scanning means for generating detector signals used to determine pitch and roll attitude information.

2. A method of determining the orientation of an orbiting body by scanning the discontinuity in optical radiation in a field of view between a reference body and outer space from at least three scans of the reference body using a scanning means comprising the steps of:
   simultaneously conducting at least three conical scans of the field of view about the axis of rotation of the orbiting body using said scanning means,
   displacing the phase and elevation of the at least three conical scans with respect to each other about the axis of rotation in order to scan at least three lines of discontinuity of optical radiation across said reference body,
   applying the optical radiation from said at least three conical scans to a detector means, and
   determining the orientation of said orbiting body with respect to said reference body using signals generated by optical radiation applied to said detector means from said at least three scans of said field of view.

* * * * *